(12) United States Patent
Ishiga

(10) Patent No.: US 7,957,588 B2
(45) Date of Patent: Jun. 7, 2011

(54) IMAGE PROCESSOR AND COMPUTER PROGRAM PRODUCT

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 1158 days.

(21) Appl. No.: 11/631,170

(22) PCT Filed: Jun. 24, 2005

(86) PCT No.: PCT/JP2005/011598
§ 371 (c)(1),
(2), (4) Date: Feb. 5, 2007

(87) PCT Pub. No.: WO2006/006373
PCT Pub. Date: Jan. 19, 2006

(65) Prior Publication Data
US 2008/0123999 A1 May 29, 2008

(30) Foreign Application Priority Data
Jul. 7, 2004 (JP) .................................. 2004-200890

(51) Int. Cl.
*G06K 9/00* (2006.01)
(52) U.S. Cl. ......... 382/167; 382/162; 358/524; 348/441
(58) Field of Classification Search .................. 382/162, 382/167, 254, 299, 300; 348/441; 358/525
See application file for complete search history.

(56) References Cited

U.S. PATENT DOCUMENTS
| | | | |
|---|---|---|---|
| 4,642,678 A | | 2/1987 | Cok |
| 5,048,110 A | * | 9/1991 | Nakajima .................... 382/130 |
| 5,091,972 A | | 2/1992 | Kwon et al. |
| 5,172,227 A | * | 12/1992 | Tsai et al. .................. 375/240.2 |
| 5,398,121 A | * | 3/1995 | Kowalewski et al. ......... 358/504 |
| 5,461,655 A | | 10/1995 | Vuylsteke et al. |

(Continued)

FOREIGN PATENT DOCUMENTS
EP  1 282 305 A1  2/2003

(Continued)

OTHER PUBLICATIONS

Supplementary Partial European Search Report issued in European Patent Application No. 05 75 3013 on Dec. 1, 2009.

*Primary Examiner* — Bhavesh M Mehta
*Assistant Examiner* — Sean Motsinger
(74) *Attorney, Agent, or Firm* — Oliff & Berridge, PLC

(57) ABSTRACT

To acquire the signal values of all the color components (RGB) at the positions of all the pixels constituting an image, the processing for interpolating the signal value of a lacking color component is performed by converting the gradation space from a linear gradation space into a square root gradation space with offset as follows. An offset $\epsilon$ in proportion to the ISO sensitivity preset for an imaging device is added to a linear gradation signal x. The value $(x+\epsilon)$ after the offset is converted into a gamma space of one-half power. Therefore, the errors contained in the signal values after the gamma conversion are equalized over the whole gradation by the error propagation rule. The slope of the curve 23 indicating the square-root gradation space with offset is not steeper in a region (e.g. 0<x<0.1) where the linear input is smaller than that of the curve 22 indicating the mere square-root gradation space.

15 Claims, 10 Drawing Sheets

U.S. PATENT DOCUMENTS

| | | | |
|---|---|---|---|
| 5,552,827 A | 9/1996 | Maenaka et al. | |
| 5,684,888 A | 11/1997 | Vuylsteke | |
| 6,040,860 A | 3/2000 | Tamura et al. | |
| 6,415,053 B1* | 7/2002 | Norimatsu | 382/199 |
| 6,608,943 B1* | 8/2003 | Hirashima | 382/298 |
| 6,697,537 B2* | 2/2004 | Norimatsu | 382/275 |
| 6,724,943 B2 | 4/2004 | Tsuchiya et al. | |
| 6,906,747 B2* | 6/2005 | Okada | 348/241 |
| 7,317,481 B2* | 1/2008 | Harada et al. | 348/243 |
| 7,330,287 B2* | 2/2008 | Sharman | 358/1.9 |
| 7,362,894 B2* | 4/2008 | Ono et al. | 382/167 |
| 7,421,132 B2* | 9/2008 | Okada | 382/238 |
| 7,667,764 B2* | 2/2010 | Kamon et al. | 348/364 |
| 7,734,110 B2* | 6/2010 | Bosco et al. | 382/264 |
| 2002/0001409 A1* | 1/2002 | Chen et al. | 382/167 |
| 2003/0038957 A1* | 2/2003 | Sharman | 358/1.9 |
| 2004/0017495 A1 | 1/2004 | Funakoshi et al. | |
| 2004/0109068 A1* | 6/2004 | Mitsunaga et al. | 348/222.1 |
| 2005/0008246 A1* | 1/2005 | Kinjo | 382/254 |
| 2005/0264683 A1* | 12/2005 | Kamon et al. | 348/362 |
| 2005/0280868 A1* | 12/2005 | Kamon et al. | 358/3.01 |
| 2006/0115177 A1* | 6/2006 | Ishiga | 382/275 |
| 2008/0089601 A1* | 4/2008 | Ishiga | 382/263 |
| 2008/0095431 A1* | 4/2008 | Ishiga | 382/167 |
| 2008/0199100 A1* | 8/2008 | Ishiga | 382/263 |
| 2008/0267526 A1* | 10/2008 | Mitsunaga et al. | 382/274 |
| 2010/0092103 A1* | 4/2010 | Ishiga | 382/264 |

FOREIGN PATENT DOCUMENTS

| | | | |
|---|---|---|---|
| JP | A 60-219872 | | 11/1985 |
| JP | A 5-502534 | | 4/1993 |
| JP | A 8-237545 | | 9/1996 |
| JP | A 11-187420 | | 7/1999 |
| JP | A 2001-169127 | | 6/2001 |
| JP | A 2002-112121 | | 4/2002 |
| JP | 2002135651 A | * | 5/2002 |
| JP | A 2003-333613 | | 11/2003 |
| JP | A 2003-348608 | | 12/2003 |
| JP | A 2004-7164 | | 1/2004 |
| JP | A 2004-56568 | | 2/2004 |
| JP | A 2004-112741 | | 4/2004 |
| JP | A 2004-220553 | | 8/2004 |
| JP | B 3599376 | | 12/2004 |
| JP | B 3609138 | | 1/2005 |
| WO | WO 02/071761 A1 | | 9/2002 |

* cited by examiner

FIG.5

|   |   | B |   |   |
|---|---|---|---|---|
|   |   | G |   |   |
| B | G | B | G | B |
|   |   | G |   |   |
|   |   | B |   |   |

FIG.6

| R | × | R |
|---|---|---|
| × | × |   |
| R |   | R |

FIG.7

| G | G | G |
|---|---|---|
| G | G | G |
| G | G | G |

FIG.8

| B | × | B |
|---|---|---|
| × | × |   |
| B |   | B |

FIG.15

| -1 | 0 | -1 | 0 | -1 |
|---|---|---|---|---|
| 0 | 0 | 0 | 0 | 0 |
| -1 | 0 | 8 | 0 | -1 |
| 0 | 0 | 0 | 0 | 0 |
| -1 | 0 | -1 | 0 | -1 |

FIG.16

| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

/256

IMAGE PROCESSOR AND COMPUTER PROGRAM PRODUCT

TECHNICAL FIELD

The present invention relates to an image processing technology whereby an image is processed by utilizing a gradation space optimal for processing an image containing noise and, in particular, an image containing noise originating in the image-capturing device.

BACKGROUND ART

Several types of gradation spaces to be used for interpolation processing have been proposed to be adopted in conjunction with processing for interpolating an image captured through color filters disposed so as to achieve a specific color array such as the Bayer array, with the color components thereof sub-sampled and thus restoring the image to a color image. Patent reference literature 1 discloses a technology whereby after taking a simple average of the G color component with a linear gradation, each of the color components, i.e., the R color, the G color and the B color is converted to each of the color components in a logarithmic gradation space and then interpolated in color difference planes by taking the differences between the R color component and the G color component and between the B color component and the G color component in this gradation space. Patent reference literature 2 discloses a technology whereby the color component signals are converted in advance to signals in a gamma space ($R^{i/\Gamma}$, $G^{i/\Gamma}$, $B_{i/\Gamma}$) with $\Gamma$ set equal to 2.4 in accordance with the processing executed after the interpolation processing e.g., compression processing, display processing and the like, and the extent of the quantization error attributable to the repeated execution of gradation conversion is minimized through integrated execution of image processing including the interpolation processing in the gamma space. Patent reference literature 3 discloses a technology whereby the color component signals are converted in a gamma space with square root characteristics and a clearly defined image is obtained by minimizing the adverse effect of shot noise contained in the image through interpolation processing executed in the gamma space.

Patent reference literature 1: U.S. Pat. No. 4,642,678
Patent reference literature 2: U.S. Pat. No. 5,172,227
Patent reference literature 3: Japanese Laid Open Patent Publication No. 2004-7164

DISCLOSURE OF THE INVENTION

Problems to be Solved by the Invention

The gradation spaces described above all tend to be readily affected by the dark noise contained in images and thus, if interpolation processing is executed in any of the gradation spaces on an image containing a great deal of noise attributable to the dark current noise occurring at the image-capturing device, the dark noise becomes amplified, which is bound to lower the quality of the restored image. The issue of dark noise becomes even more problematic when interpolating an image captured by raising the ISO sensitivity (e.g., to a level equal to or higher than the level equivalent to ISO 1600). The deterioration in the image quality may occur as black points appearing in areas having a red color base in the image resulting from the interpolation processing. In addition, when executing processing other than interpolation processing on an image obtained via an image-capturing device, too, the processing is normally affected by the sensor noise. Accordingly, the present invention provides a gradation space optimal for processing an image containing sensor noise.

Means for Solving the Problems

According to the 1st aspect of the invention, an image processing apparatus comprises an image input means to which linear gradation image signals, each expressed as a signal that is in proportion to a quantity of light received at a pixel, are input, an offset means for adding an offset signal indicating a predetermined quantity to each of the linear gradation image signals, a gradation conversion means for executing gradation conversion to convert each of the image signals to which the offset signal has been added to a square root gradation image signal, and an image conversion means for converting a first image to a second image by executing a specific type of image processing with image signals corresponding to a plurality of pixels, which have undergone the gradation conversion.

According to the 2nd aspect of the invention, an image processing apparatus comprises an image input means to which linear gradation image signals constituted with a plurality of types of color component signals with at least one color component signal which is expressed as a signal in proportion to a quantity of received light for each pixel, are input, an offset means for adding an offset signal indicating a predetermined quantity to each of the linear gradation image signals, a gradation conversion means for executing gradation conversion to convert each of the image signals to which the offset signal has been added to a square root gradation image signal, and a color information generation means for generating at least one common color component signal for each pixel by using image signals corresponding to a plurality of pixels, which have undergone the gradation conversion.

According to the 3rd aspect of the invention, the image processing apparatus in the 1st aspect may further comprise a noise evaluation means for evaluating an extent of image signal fluctuation indicating a specific amount in a gradation space resulting from the gradation conversion as a representative value indicating noise characteristics of the input image signals.

According to the 4th aspect of the invention, in the image processing apparatus in the 3rd aspect, the image conversion means may convert the first image to the second image by using the representative value obtained by the noise evaluation means.

According to the 5th aspect of the invention, the image processing apparatus in the 2nd aspect may further comprise a noise evaluation means for evaluating an extent of image signal fluctuation indicating a specific amount in a gradation space resulting from the gradation conversion as a representative value indicating noise characteristics of the input image signals.

According to the 6th aspect of the invention, in the image processing apparatus in the 5th aspect, the color information generation means may generate at least one common color component signal for each pixel by using the representative value obtained by the noise evaluation means.

According to the 7th aspect of the invention, the image processing apparatus comprises an image input means to which linear gradation image signals, each expressed as a signal in proportion to a quantity of light received at each pixel, are input, an offset means for adding an offset signal indicating a predetermined quantity to each of the linear gradation image signals, a gradation conversion means for executing gradation conversion to convert each of the image signals to which the offset signal has been added to a nonlinear gradation image signal, and an image conversion means for converting a first image to a second image by executing a specific type of processing with image signals corresponding to a plurality of pixels, which have undergone the gradation conversion.

According to the 8th aspect of the invention, the image processing apparatus comprises an image input means to which linear gradation image signals constituted with a plurality of types of color component signals with at least one color component signal which is expressed as a signal in proportion to a quantity of received light for each pixel, are input, an offset means for adding an offset signal indicating a predetermined quantity to each of the linear gradation image signals, a gradation conversion means for executing gradation conversion to convert each of the image signals to which the offset signal has been added to a nonlinear gradation image signal, and a color information generation means for generating at least one common color component signal for each pixel by using image signals corresponding to a plurality of pixels, which have undergone the gradation conversion.

According to the 9th aspect of the invention, in the image processing apparatus in any one of the 1st through the to 8th aspect, the offset means may select a positive value to be set for the predetermined quantity.

According to the 10th aspect of the invention, in the image processing apparatus in any one of the 1st through the 9th aspect, the offset means may adjust the predetermined quantity in correspondence to an imaging sensitivity setting selected at an image-capturing device while capturing the input image.

According to the 10th aspect of the invention, in the image processing apparatus in the 10th aspect, the offset means may increase the predetermined quantity as a higher imaging sensitivity setting is selected.

According to the 12th aspect of the invention, the image processing apparatus in any one of the 1st through the 7th aspect may further comprise an inverse gradation conversion means for executing inverse conversion to inversely convert each of signals constituting the second image resulting from the conversion to a linear gradation image signal, and an inverse offset means for subtracting the offset signal indicating the predetermined quantity from each of the image signals having undergone the inverse gradation conversion.

According to the 13th aspect of the invention, the image processing apparatus in the 2nd or the 8th aspect may further comprise an inverse gradation conversion means for executing inverse conversion to inversely convert each of the image signals constituted with the color component signals having been generated to a linear gradation image signal, and an inverse offset means for subtracting an offset signal indicating the predetermined quantity from each of the image signals having undergone the inverse gradation conversion.

According to the 14th aspect of the invention, the image processing apparatus comprises an image input means to which linear gradation image signals, each expressed as a signal in proportion to a quantity of light received at a pixel, are input, a gradation conversion means for executing gradation conversion to convert each of the linear gradation image signals to a nonlinear gradation image signal, an image conversion means for converting a first image to a second image by executing a specific type of image processing with image signals corresponding to a plurality of pixels, which have undergone the gradation conversion, and a control means for controlling the gradation conversion means so as to alter nonlinear gradation characteristics in correspondence to an imaging sensitivity setting selected at an image-capturing device while capturing the input image.

According to the 15th aspect of the invention, the image processing apparatus comprises an image input means to which linear gradation image signals constituted with a plurality of types of color component signals with at least one color component signal which is expressed as a signal in proportion to a quantity of received light for each pixel, are input, a gradation conversion means for executing gradation conversion to convert each of the linear gradation image signals to a nonlinear gradation image signal, a color information generation means for generating at least one common color component signal for each pixel by using image signals corresponding to a plurality of pixels, which have undergone the gradation conversion, and a control means for controlling the gradation conversion means so as to alter nonlinear gradation characteristics in correspondence to an imaging sensitivity setting selected at an image-capturing device while capturing the input image.

According to the 16th aspect of the invention, in the image processing apparatus in the 14th or the 15th aspect, the control means may control the gradation conversion means so as to increase a curvature of low-brightness side gradation characteristics when a lower imaging sensitivity setting is selected and to reduce the curvature of the low-brightness side gradation characteristics when a higher imaging sensitivity setting is selected.

According to the 17th aspect of the invention, in the image processing apparatus in any one of the 14th through the 16th aspect, the control means may control the gradation conversion means so as to make nonlinear gradation characteristics more closely approximate square root gradation characteristics when a lower imaging sensitivity setting is selected.

According to the 18th aspect of the invention, in the image processing apparatus in any one of the 2nd, the $8^{th}$ and the 15th aspect, the color information generation means may generate the common color component signal for each of the pixels by using signals corresponding to at least two different color components.

According to the 19th aspect of the invention, in the image processing apparatus in the 18th aspect, the color information generation means may calculate similarity factors along at least two directions by using nonlinear color component signals corresponding to a plurality of pixels, which have undergone the gradation conversion, judge a level of similarity manifesting along each of the two directions by comparing a difference between the similarity factors calculated along the two directions with a predetermined threshold value, and generate the color component signal for each pixel based upon judgment results.

According to the 20th aspect of the invention, a computer program product having contained therein an image processing program that enables a computer apparatus to execute offset processing for adding an offset signal indicating a predetermined quantity to each of linear gradation image signals each expressed as a signal in proportion to a quantity of light received at each pixel, gradation conversion processing for converting each of the image signals having undergone the offset processing to a nonlinear gradation image signal, and image conversion processing for converting a first image to a second image by executing a specific type of image processing with image signals corresponding to a plurality of pixels, which have undergone the gradation conversion processing.

According to the 21st aspect of the invention, a computer program product having contained therein an image processing program that enables a computer apparatus to execute gradation conversion processing for converting each of linear gradation image signals, each expressed as a signal in proportion to a quantity of light received at each pixel, to a nonlinear gradation image signal, image conversion processing for converting a first image to a second image by executing a specific type of image processing with image signals corresponding to a plurality of pixels, which have undergone the gradation conversion processing, and gradation control processing for altering nonlinear gradation characteristics in correspondence to an imaging sensitivity setting selected at an image-capturing device while capturing an image.

The image input unit can be replaced with an image means.

The offset unit can be replaced with an offset means.

The gradation conversion unit can be replaced with a gradation conversion means.

The image conversion unit can be replaced with an image conversion means.

The color information generation unit can be replaced with a color information generation means.

The noise evaluation unit can be replaced with a noise evaluation means.

The inverse gradation conversion unit can be replaced with an inverse gradation conversion means.

The inverse offset unit can be replaced with an inverse offset means.

The control unit can be replaced with a control means.

Effect of the Invention

According to the present invention, even an image containing noise originating from the imaging device can be processed in a gradation space that is not readily affected by the noise.

BRIEF DESCRIPTION OF THE DRAWINGS

FIG. 5 shows a specific positional relationship assumed by individual pixels for G color interpolation;

FIG. 6 shows a specific positional relationship assumed by individual pixels for R color interpolation;

FIG. 7 shows a specific positional relationship assumed by individual pixels for R color interpolation;

FIG. 8 shows a specific positional relationship assumed by individual pixels for B color interpolation;

FIG. 15 shows a diagram illustrating the high pass filter processing; and

FIG. 16 shows a diagram illustrating the low pass filter processing.

BEST MODE FOR CARRYING OUT THE INVENTION

The following is an explanation of the best mode for carrying out the present invention.

First Embodiment

In reference to the first embodiment, image processing executed to interpolate an image captured through R (red), G (green) and B (blue) color filters disposed in the Bayer array is explained. The color of the image captured through these color filters is expressed in the RGB calorimetric system.

Figure 1:
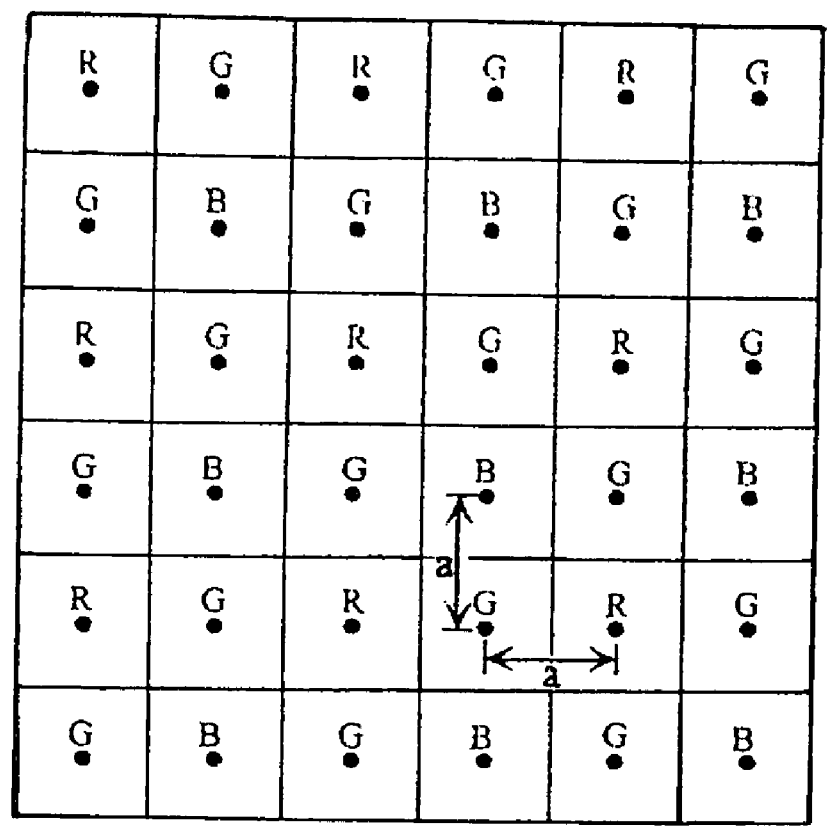
FIG. 1 is an illustration of the Bayer array.

FIG. 1 shows the Bayer array. Image signals output from an image-capturing device equipped with color filters disposed in the Bayer array each holds information related to one of the color components, R, G and B in correspondence to a specific pixel. Namely, R color information is output from a pixel corresponding to an R color filter, G color information is output from a pixel corresponding to a G color filter and B color information is output from a pixel corresponding to a B color filter. In other words, the pixel information corresponding to an R color filter, for instance, is exclusively constituted with R component information and does not contain G component information or B component information. For this reason, the missing color component information at each pixel position must be obtained through calculation by executing interpolation processing in order to acquire information corresponding to all the color components, R, G and B at all the positions assumed by the pixels constituting the image.

Figure 2:
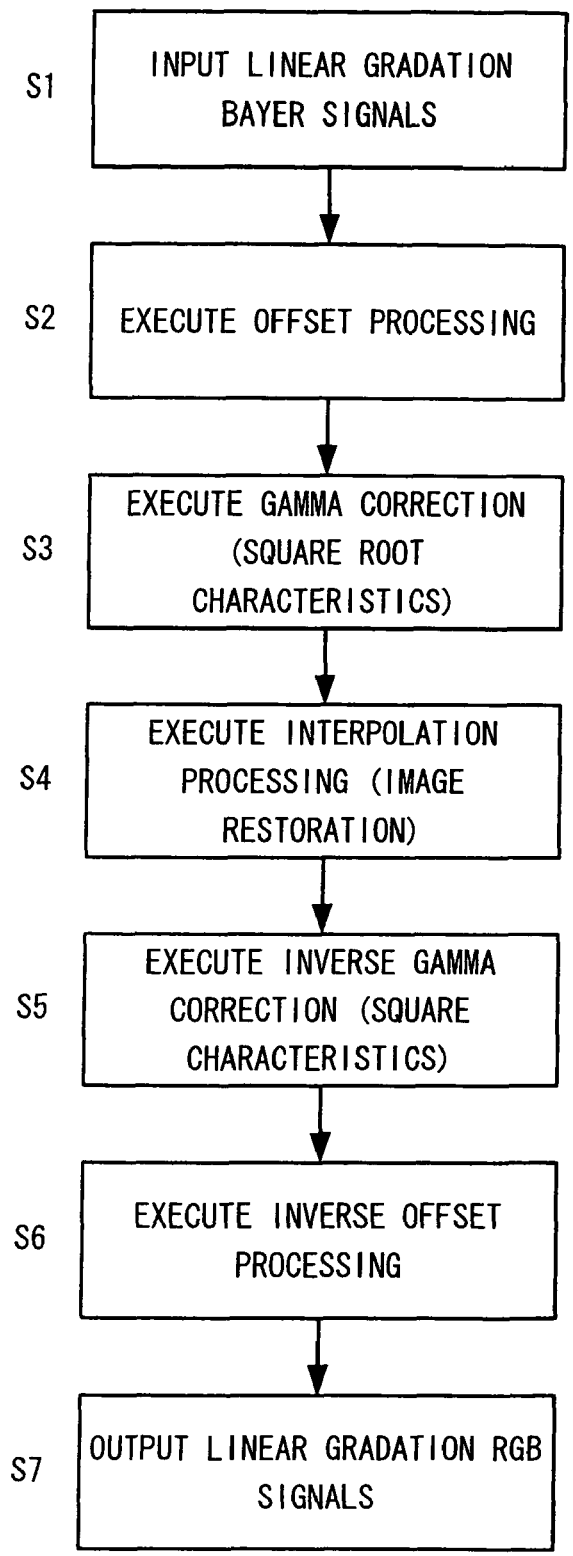
FIG. 2 presents a flowchart of the image interpolation processing according to the present invention.
Figures 3, 4:
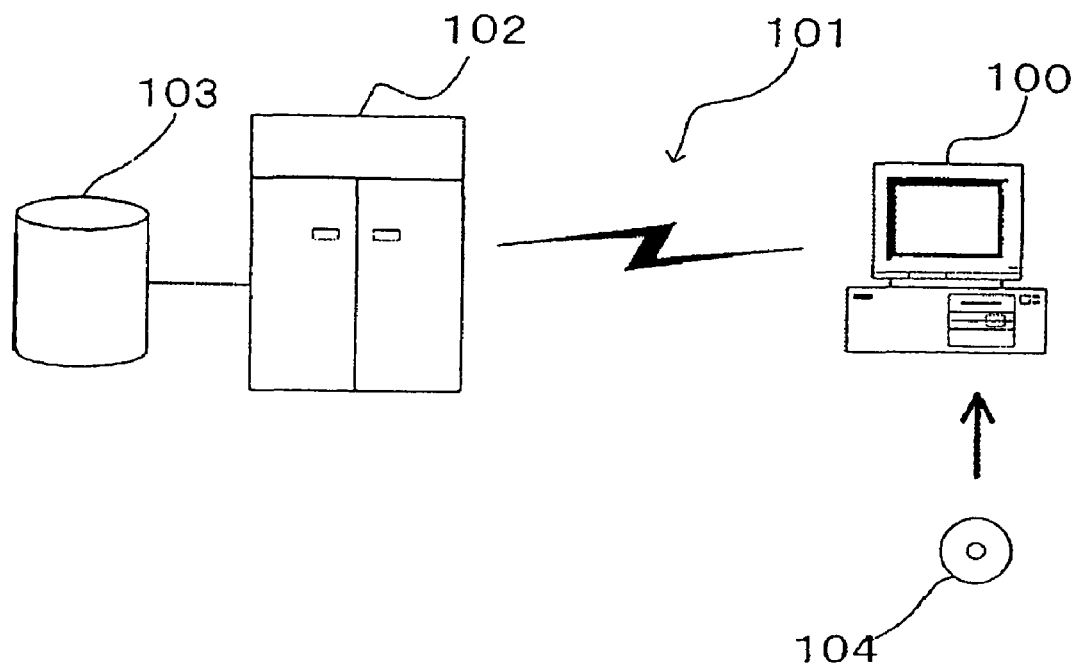
FIG. 3 shows an illustration of various modes that may be adopted when providing the program.
FIG. 4 shows a specific positional relationship assumed by individual pixels for G color interpolation.

FIG. 2 presents a flowchart of the image interpolation processing according to the present invention. In this embodiment, a computer apparatus 100 shown in FIG. 3 functions as an image processing apparatus by executing the program in conformance to which the processing in FIG. 2 is executed. The program loaded into a data storage device of the personal computer 100 is taken into the personal computer, which then executes the program to function as an image processing apparatus.

The program may be loaded by setting a recording medium 104 such as a CD-ROM having stored therein the program into the personal computer 100 or it may be loaded into the personal computer 100 through a communication line 101, which may be a network. The program may be provided through the network 101 from a server computer 102 connected to the network 101, which includes a hard disk device 103 or the like of where the program is stored in advance. Namely, the program may be distributed as a computer program product adopting any of various modes including the recording medium 104 and a download via the communication line 101.

In step S1 in FIG. 2, the CPU in the computer apparatus 100 (see FIG. 3) takes in image signals (Bayer signals) expressed in a linear gradation space and then the operation proceeds to step S2. More specifically, the CPU reads out the image data to undergo the interpolation processing into its work area. At this time, if the individual color components are expressed in a gradation space having undergone gamma correction, the color component values should be reconverted to signal values in the linear gradation space before gamma correction.

In step S2, the CPU executes offset processing for the image signals corresponding to all the pixels constituting the image and then the operation proceeds to step S3. More specifically, it adds an offset Δ to the signal value X(i, j) corresponding to each pixel indicated by a specific pixel position (i, j) and thus obtains a post-offset signal value X'(i, j) as expressed in (1) below.

$$X'(i,j)=X(i,j)+\Delta \quad (1)$$

It is to be noted that the offset Δ should be determined in correspondence to the imaging sensitivity (hereafter referred to as ISO sensitivity) having been selected for the image-capturing device during a photographing operation. For instance, if the level of the selected imaging sensitivity is equivalent to ISO 6400, the offset Δ is set to be 0.05 Xmax, if the imaging sensitivity level is equivalent to ISO 1600, the offset Δ is set to be 0.02 Xmax and if the imaging sensitivity level is equal to or lower than the equivalent of ISO 200, the offset Δ is set to be 0. Xmax represents the maximum value (i.e., the full-scale value) of the gradation levels in the input image signal X. Namely, the range of the input linear gradation signal X is $0 \leq X \leq X\max$. In the embodiment, a common offset Δ is added to each signal value, regardless of the color component, i.e., the R component, the G component or the B component, corresponding to the signal.

In step S3, the CPU executes gamma correction on the signal value X'(i, j) having undergone the offset processing so as to convert it to a square root gradation space as expressed in (2) below, and then the operation proceeds to step S4. The post-gamma correction square root gradation space is used for the interpolation processing.

$$Y=Y\max \times \sqrt{(X'/X\max)} \quad (2)$$

It is to be noted that the signal Y resulting from the gradation conversion assumes a range expressed as $0 \leq Y \leq Y\max$.

In step S4, the CPU executes the interpolation processing as explained below. In the explanation, a pixel holding R component color information is referred to as an R pixel, a pixel holding B component color information is referred to as a B pixel, a pixel holding G component color information is referred to as a G pixel and R(i, j), G(i, j) and B(i, j) respectively indicate the R component signal value, the G component signal value and the B component signal value corresponding to a pixel indicated by the pixel position (i, j) in the interpolation processing space.

(Directional Judgment)

The CPU calculates a vertical similarity factor CvN(i, j) and a horizontal similarity factor ChN(i, j) as expressed in (3) and (4) below respectively, with regard to each non-G pixel (an R pixel or a B pixel) indicated by the pixel position (i, j).

$$Cv[i,j]=\{|G[i,j-1]-G[i,j+1]|+(|G[i,j-1]-Z[i,j]|+|G[i,j+1]-Z[i,j]|)/2\}/2 \quad (3)$$

$$Ch[i,j]=\{|G[i-1,j]-G[i+1,j]|+(|G[i-1,j]-Z[i,j]|+|G[i+1,j]-Z[i,j]|)/2\}/ \quad (4)$$

It is to be noted that Z (i, j) indicates the R component or B component signal value at the pixel indicated by the pixel position (i, j).

Based upon the absolute value in the first term of each of the expressions (3) and (4), approximate directionality can be detected through comparison of G color component values. The absolute values in the second term and the third term in each of the expressions (3) and (4) above are used to detect finer details of similarity that cannot be detected with the absolute value in the first term. The CPU calculates the vertical similarity factor and the horizontal similarity factor as expressed in (3) and (4) at each coordinate point, and determines the direction of similarity as expressed in (5) below based upon the vertical and horizontal similarity factors calculated at the target coordinate point (i, j).

$$\begin{array}{ll} \text{if } |Cv[i,j]-Ch[i,j]| \leq Th & HV[i,j]=0 \\ \text{else if } Cv[i,j]<Ch[i,j] & HV[i,j]=1 \\ \text{else} & HV[i,j]=-1 \end{array} \quad (5)$$

It is to be noted that Th represents a decision-making threshold value used to prevent erroneous judgment due to noise contained in the signal values, which is adjusted in correspondence to the ISO sensitivity explained earlier. HV(i, j) indicates the direction of similarity at the pixel position (i, j), with HV(i, j)=0 indicating that similarity manifests along both the vertical and horizontal directions, HV (i, j)=1 indicating that similarity manifests along the vertical direction and HV(i, j)=−1 indicating that similarity manifests along the horizontal direction.

(G Interpolation)

Based upon the direction along which similarity manifests, which has been determined as described above, the CPU interpolates the signal value with a G component value by using unevenness (or curvature) information corresponding to the R component or the B component. The G color interpolation value is calculated as expressed in (6) and (9) if similarity is judged to manifest along the vertical direction with regard to the R pixel assuming the central position (i, j) in FIG. 4, whereas the G color interpolation value is calculated as expressed in (7) and (10) below for the same pixel if similarity is judged to manifest along the horizontal direction. FIG. 5 shows the specific positional relationships assumed by the individual pixels for G color interpolation to be executed at the position corresponding to the B pixel.

$$\text{If } HV(i,j)=1, G(i,j)=Gv(i,j) \quad (6)$$

$$\text{If } HV(i,j)=-1, G(i,j)=Gh(i,j) \quad (7)$$

$$\text{If } HV(i,j)=0, G(i,j)=\{Gv(i,j)+Gh(i,j)\}/2 \quad (8)$$

with $$Gv[i,j]=(G[i,j-1]+G[i,j+1])/2+(2*Z[i,j]-Z[i,j-2]-Z[i,j+2])/4 \quad (9)$$

$$Gh[i,j]=(G[i-1,j]+G[i+1,j])/2+(2*Z[i,j]-Z[i-2,j]-Z[i+2,j])/4 \quad (10)$$

It is to be noted that Z(i, j) indicates the R component or B component signal value at the pixel indicated by the pixel position (i, j).

The first term in expression (9) above indicates the average value calculated by using signal values G(i, j−1) and G(i, j+1) corresponding to the G component, which are present above and below along the vertical direction relative to the pixel position (i, j). The second term in expression (9) indicates the extent of change, which is calculated based upon signal values R(i, j), R(i, j−2) and R(i, j+2) corresponding to the R component, which are present along the vertical direction. By adding the extent of change manifesting in the R component signal values to the average value of the G component signal values, the G component interpolation value G(i, j) is obtained. Since such interpolation allows a G component interpolation value to be estimated at a point other than a G component interior dividing point as well, it is to be hereafter referred to as extrapolation for purposes of convenience.

Expression (10) above indicates that a G interpolation value is also calculated through horizontal extrapolation executed in a manner similar to that adopted for the vertical extrapolation described above for the pixel at the pixel position (i, j) by using the signal values at pixels along the horizontal direction relative to the pixel position (i, j).

If it has been decided that similarity manifests both along the vertical direction and along the horizontal direction, the CPU calculates two G color interpolation values as expressed in (9) and (10) and designates an average value of the two G color interpolation values thus calculated as the G color interpolation value.

(R Interpolation)

R color interpolation values are calculated as expressed in (11) to (13) below respectively for, for instance, pixel positions (i+1, j), (i, j+1) and (i+1, j+1) other than the R pixel position (i, j) in FIG. 6. At this time, the unevenness information of the G component signal values (see FIG. 7) corresponding to all the pixel positions, obtained through the G interpolation described above, is utilized.

$$R[i+1,j]=(R[i,j]+R[i+2,j])/2+(2*G[i+1,j]-G[i,j]-G[i+2,j])/2 \quad (11)$$

$$R[i,j+1]=(R[i,j]+R[i,j+2])/2+(2*G[i,j+1]-G[i,j]-G[i,j+2])/2 \quad (12)$$

$$R\{i+1,j+1\}=(R[i,j]+R[i+2,j]+R[i,j+2]+R[i+2,j+2])/4+(2*G[i+1,j+1]-G[i,j]-G[i+2,j]-G[i,j+2]-G[i+2,j+2])/4 \quad (13)$$

The first term in each of the expressions (11) to (13) above indicates the average value calculated based upon the R component signal values at the pixels adjacent to the coordinate point of the target pixel undergoing the R component interpolation, whereas the second term in each of expressions (11) to (13) indicates the extent of change calculated based upon the G component signal values at the coordinate point of the R component interpolation target pixel and at the pixels adjacent to the coordinate point. Namely, as in the extrapolation executed for the G interpolation, the R component interpolation value is obtained by adding the extent of the G component signal value change to the average value of the R component signal values. This process is equivalent to generating color difference Cr=R−G at the R position and executing averaging interpolation within the color difference plane.

(B Interpolation)

Figure 9:
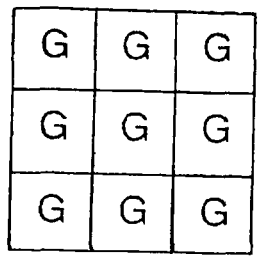
FIG. 9 shows a specific positional relationship assumed by individual pixels for B color interpolation.

B component interpolation values are calculated through interpolation processing similar to the interpolation processing executed to obtain the R component interpolation values. For instance, B color interpolation values are calculated as expressed in (14) to (16) below respectively for, for instance, pixel positions (i+1, j), (i, j+1) and (i+1, j+1) other than the B pixel position (i, j) in FIG. 8. At this time, the unevenness information of the G component signal values (see FIG. 9) corresponding to all the pixel positions, obtained through the G interpolation described above, is utilized.

$$B[i+1,j]=(B[i,j]+B[i+2,j])/2+(2*G[i+1,j]-G[i,j]-G[i+2,j])/2 \quad (14)$$

$$B[i,j+1]=(B[i,j]+B[i,j+2])/2+(2*G[i,j+1]-G[i,j]-G[i,j+2])/2 \quad (15)$$

$$B\{i+1,j+1\}=(B[i,j]+B[i+2,j]+B[i,j+2]+B[i+2,j+2])/4+(2*G[i+1,j+1]-G[i,j]-G[i+2,j]-G[i,j+2]-G[i+2,j+2])/4 \quad (16)$$

As expressions (14) to (16) above each indicate, the B component interpolation value is obtained by adding the extent of the G component signal value change to the average value of the B component signal values. This process is equivalent to generating a color difference Cb=B−G at the B position and executing averaging interpolation within this color difference plane. Since the sample frequencies of the R component and the B component are lower than that of the G component, the high frequency component in the G component signal values is reflected in the R component interpolation value and the B component interpolation value by using the color difference R−G and the color difference B−G. Accordingly, such interpolation for the chromatic components is hereafter referred to as color difference interpolation for purposes of convenience.

Through the interpolation processing explained above, an image constituted with pixels each holding signal values corresponding to the three color components, i.e., the G component, the R component and the B component, is restored. Once the CPU completes the interpolation processing, the operation proceeds to step S5.

In step S5, the CPU executes inverse gamma correction for the value Y=R, G, B of each of the signals constituting the restored image as indicated in expression (17) below to convert to a linear gradation space and then the operation proceeds to step S6.

$$X'=X\max\times(Y/Y\max)^2 \quad (17)$$

It is to be noted that X'=Rout', Gout', Bout'.

In step S6, the CPU executes inverse offset processing for the each of the image signals corresponding to all the pixels and then the operation proceeds to step S7. More specifically, the CPU subtracts the offset Δ from the signal value X'(i, j) corresponding to the specific pixel indicated by the pixel position (i, j) and thus obtains a signal value X(i, j) having undergone the inverse offset processing.

$$X(i,j)=X'(i,j)-\Delta \quad (18)$$

It is to be noted that X=Rout, Gout, Bout.

In step S7, the CPU outputs the restored image, i.e., the image signals (RGB signals) expressed in the linear gradation space, and then the processing in FIG. 2 ends. The CPU executes the final gamma correction (e.g., correction executed to optimize the RGB signals for the specific display monitor in use), color adjustment (adjustment specified by the user or adjustment for converting the signals to a device-independent color space) or the like on these RGB signals as necessary.

(Uniform Noise Space Resulting from Offset-Incorporated Square Root Conversion)

The space used for the interpolation processing mentioned earlier is now explained in detail. Image signals output from an image-capturing device normally contain various types of noise. Noise can be primarily categorized as random noise or fixed-pattern noise. The random noise can be further categorized as shot noise or dark noise.

Fixed-pattern noise is device-inherent noise attributable to, for instance, inconsistency in the formation of openings that may occur during the process of manufacturing image-capturing devices. Shot noise and dark noise are both attributable to the characteristics of photoelectric conversion elements such as photodiodes constituting the pixels at the image-capturing device. Shot noise occurs as photons fluctuates and the level of shot noise increases in proportion to the square root of the quantity of incident light. Dark noise, which contains dark current noise, occurs irrespective of the quantity of incident light and increases in proportion to the analog gain. The analog gain is a parameter which determines the ISO sensitivity.

Figure 10:
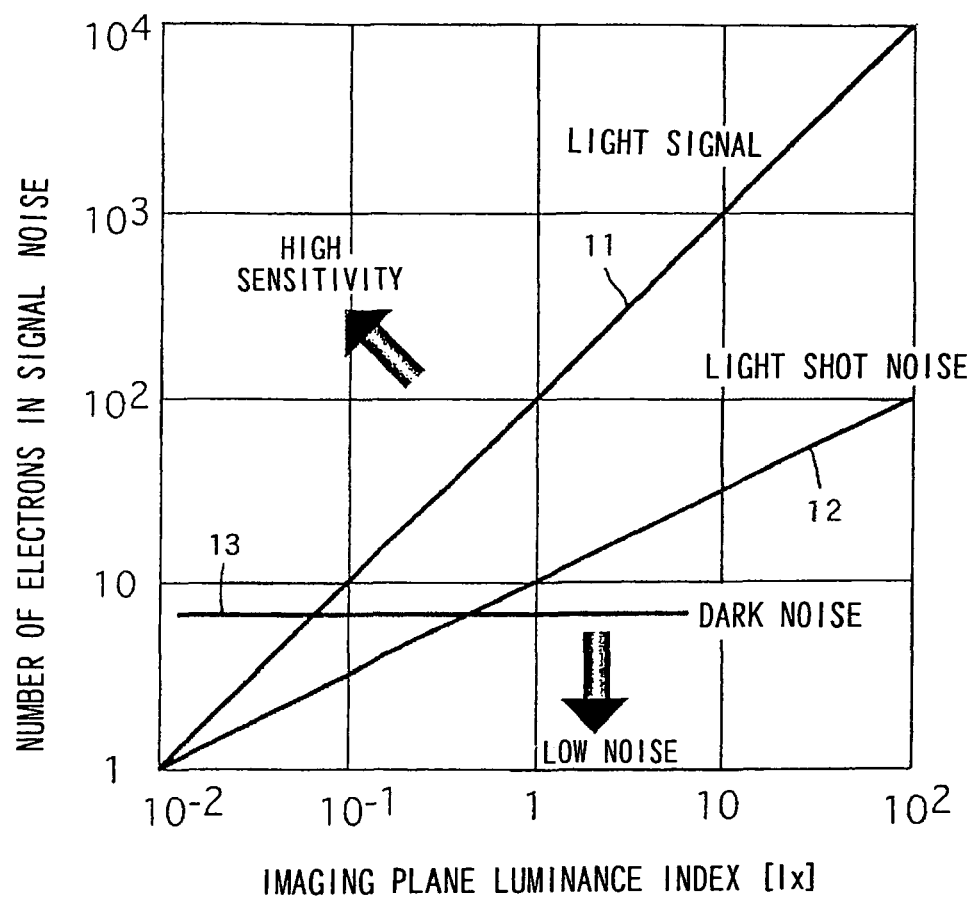
FIG. 10 illustrates the signal characteristics observed at the image-capturing device.

FIG. 10 illustrates the signal characteristics that is observed at the image-capturing device. In the diagram in FIG. 10, which is presented in a log-log scale, the image-capturing plane brightness is indicated along the horizontal axis and the number of electrons in the signal is indicated along the vertical axis. A straight line 11, representing a light signal, indicates that level of the light signal (the number of electrons) increases in proportion to the quantity of incident light. A straight line 12, representing light shot noise, indicates that the noise (number of electrons) increases in proportion to the ½ power of the quantity of the incident light. A straight-line 13, representing dark noise, indicates that noise (a specific number of electrons) is present regardless of the quantity of the incident light.

Total noise δx of the dark noise and the shot noise which affect the gradation conversion is expressed as in (19) below.

$$\delta x = \sqrt{(Ns^2 + Nd^2)} \tag{19}$$

It is to be noted that Ns and Nd respectively represent the shot noise and the dark noise. x in the expression above indicates the signal level immediately after the A/D conversion, which has already been amplified with the analog gain. In addition, it is assumed that x has been standardized for purposes of convenience by dividing the signal level by the maximum value of the gradation scales in the input signal (i.e., the full scale value).

The shot noise and the dark noise may be modeled respectively as expressed in (20) and (21) below.

$$Ns(g) = ms \times \sqrt{(g \times x)} \tag{20}$$

$$Nd(g) = md \times g + nd \tag{21}$$

It is to be noted that m and n each represent a noise model parameter and that g represents the analog gain (i.e., the ISO sensitivity set for the image-capturing device).

By substituting the noise models expressed in (20) and (21) in expression (19) and thus redefining the parameters in a simpler form, the following expression (22) is obtained.

$$\delta x = 2\alpha(g) \times \sqrt{(x + \beta(g))} \tag{22}$$

The interpolation processing space (hereafter referred to as an offset-incorporated square root gradation space) resulting from the conversion achieved by executing the square root gamma processing (step S3) following the offset processing (step S2) as described earlier is expressed as in (23) below.

$$y = \sqrt{(x + \epsilon)} \tag{23}$$

It is to be noted that x=X/Xmax and y=Y/Ymax and that ε corresponds to the offset Δ (ε=Δ/Xmax).

The noise δy in the interpolation gradation space expressed in (23) above can be expressed as in (24) below by adopting the law of propagation of errors.

$$\delta y = \sqrt{((dy/dx)^2 \times \delta x^2)} \tag{24}$$

By incorporating expressions (22) and (23) into expression (24), the noise δy can be expressed as in (25) below.

$$\delta y = \alpha(g) \times \sqrt{((x + \beta(g))/(x + \epsilon))} \tag{25}$$

Expression (25) above indicates that when ε=β (g) is true, the noise δy is indicated by a constant value α (g) regardless of the value x of the input linear gradation signal. Namely, when ε=β (g) is true, the offset-incorporated square root gradation space is a uniform noise space. According to the present invention, the offset quantity ε (Δ used in step S2), is adjusted in correspondence to the ISO sensitivity so as to ensure that ε=β (g) is true. The conditions under which ε=β (g) is true is set to be Δ=0.05 Xmax (ISO 6400 equivalent) or Δ=0.02 Xmax (ISO 1600 equivalent), as explained earlier. It is to be noted that since the uniform noise α (g) changes in correspondence to the ISO sensitivity (increases in this case), the decision-making threshold value Th explained earlier is made to change while sustaining a relationship expressed as Th∝α (g).

Figure 11:
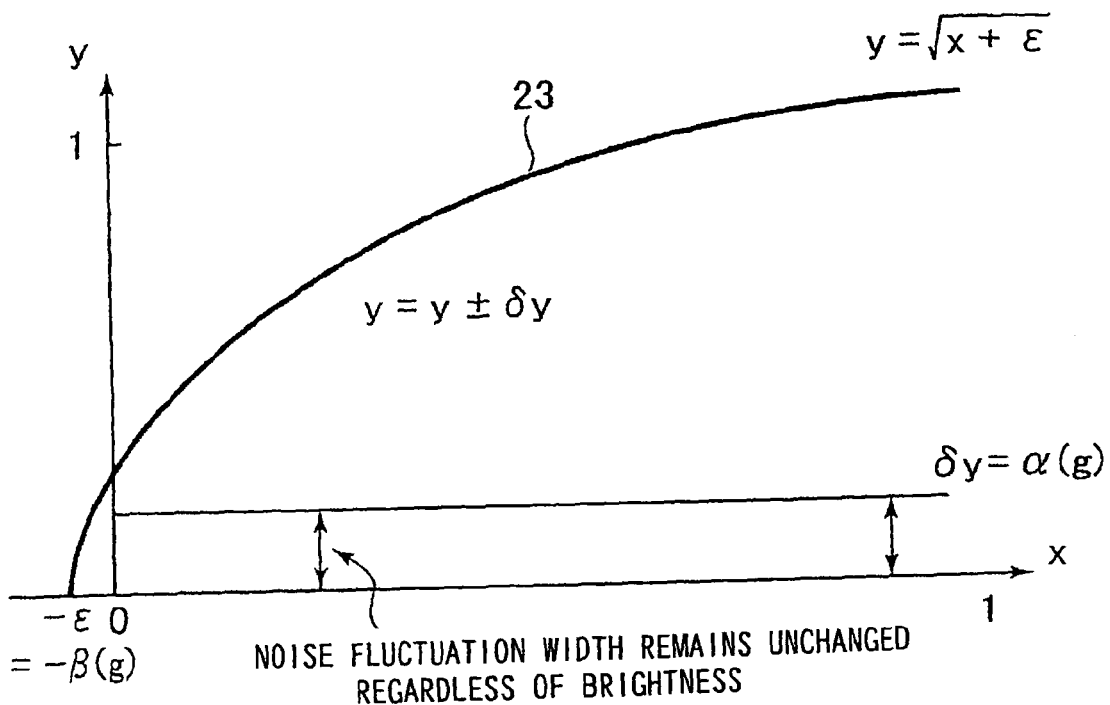
FIG. 11 shows a schematic diagram illustrating the uniform noise space.

FIG. 11 schematically illustrates the uniform noise space. In FIG. 11, the input value x of the linear gradation signal is indicated along the horizontal axis and the output value y resulting from the gradation conversion is indicated along the vertical axis. An error δy is superimposed over the output value y represented by a curve 23, with the error δy assuming a constant value α (g) at all times regardless of the value of the input value x. In other words, the extent of noise fluctuation remains unchanged at all times in the uniform noise space, irrespective of the brightness of the image (irrespective of the input value).

(Comparison with Square Root Gradation Space)

Figure 12:
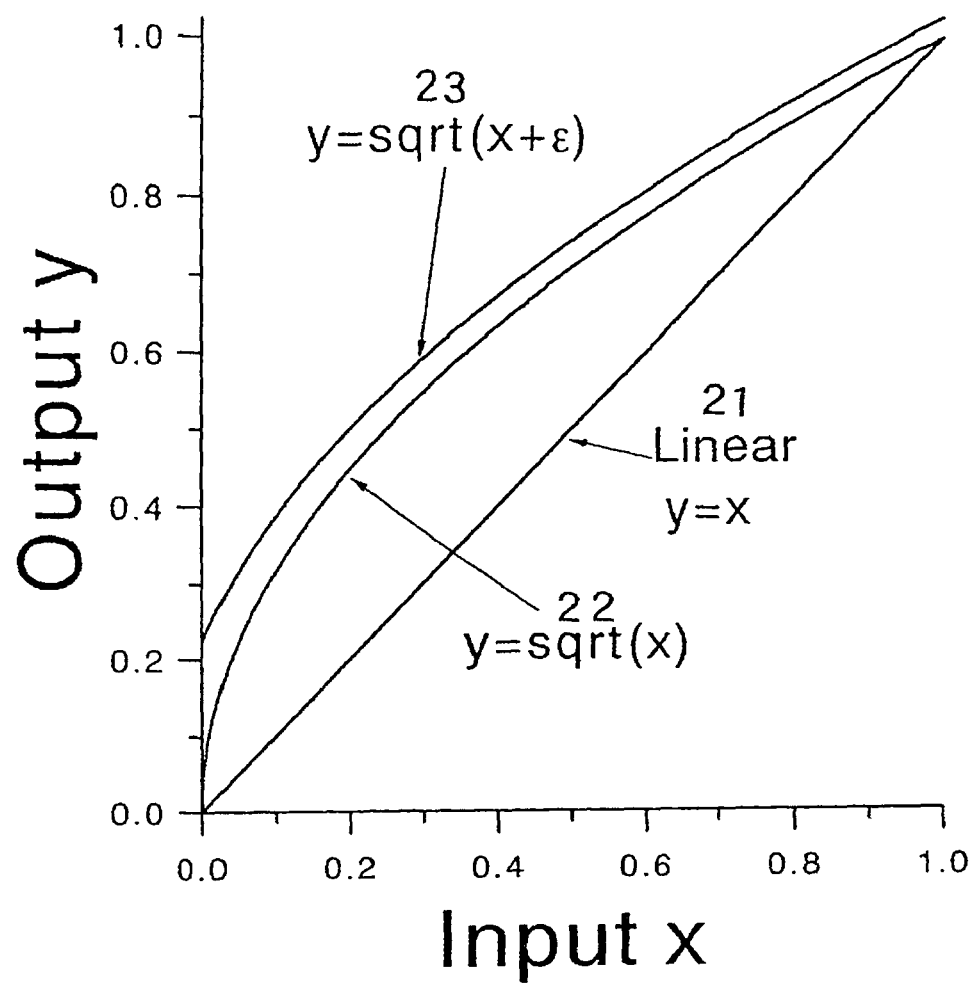
FIG. 12 shows the input output characteristics of various gradation spaces.

FIG. 12 shows the input/output characteristics in the individual spaces, i.e., the linear gradation space, the square root gradation space and the offset-incorporated square root gradation space. In FIG. 12, the linear gradation signal input value x is indicated along the horizontal axis and the post-gradation conversion output value y is indicated along the vertical axis. A straight line 21 indicates the input/output characteristics observed in the linear conversion, a curve 22 indicates the input/output characteristics observed during conversion to the square root gradation space and a curve 23 indicates the input/output characteristics observed during conversion to the offset-incorporated square root gradation space. The slope of the curve 22 is steep when the input linear value is small (e.g., 0<x<0.1), i.e., over the range in which the dark noise is dominant. In other words, the slope of the curve 22 is steeper in a low brightness range. For this reason, if the input value fluctuates due to noise, the output value contains a greater extent of fluctuation since the fluctuation having occurred on the input side becomes amplified.

An explanation is now given on the degradation of the image quality due to the amplification of the fluctuation in the square root gradation space. In the case of, for instance, the R component interpolation, the R component is interpolated by using the unevenness information in the G component signal values obtained through the G interpolation, and thus, interpolated R component signal values are affected by the noise fluctuation contained in the G component signal values. The noise $\delta R_{INTERPOLATED}$ contained in each interpolated R component signal value can be expressed as in (26) below by adopting the law of propagation of errors.

$$\delta R_{interpolated} = \sqrt{\delta R_{Bayer}^2 + \delta G_{interpolated}^2} \tag{26}$$

It is to be noted that the partial derivatives normally attached to each error term is omitted in the expression above, since it assumes a value approximately equal to 1.

When the image has a red base, the signal obtained at R pixel indicates a large value but the G component signal value obtained through interpolation in correspondence to the R pixel position is small. As explained earlier, the noise is amplified over a dark area (with small linear input values) in the square root gradation space (curve 22). Thus, the noise $\delta G_{INTERPOLATED}$ superimposed over the G component signal value (which is significantly smaller than the large R component signal value) assumes an extremely large value relative to the noise $\delta R_{Bayer}$ superimposed over the R component signal value. As a result, if the noise $\delta R_{INTERPOLATED}$ in an R component signal value obtained through the interpolation processing is caused to fluctuate greatly by the noise $\delta G_{INTERPOLATED}$, some of the R component signal value possibly decreases to a level close to 0, and this signal value manifests as a black dot in the red base. In short, if interpolation processing is simply executed in the square root gradation space, $\delta R_{Bayer}$ and $\delta G_{INTERPOLATED}$ become varied depending upon the brightness levels of R, G and B.

In contrast, the slope does not become steep over the range in which the dark noise is dominant (e.g., 0<x<0.1) in the offset-incorporated square root gradation space (curve 23). Thus, since the noise $\delta G_{INTERPOLATED}$ superimposed over the small G component signal value does not assume a large value in the image with a red base, the noise $\delta R_{INTERPOLATED}$ contained in the interpolated R component signal value does not vary. As a result, no black dot manifests in the red base.

The following advantages are achieved in the embodiment described above.

(1) In order to obtain signal values corresponding to all the color components (R, G and B in the example described above) at each of the positions of the pixels constituting an image, the processing for obtaining a missing color component signal value through interpolation is executed by converting the linear conversion gradation space to an offset-incorporated square root gradation space. Namely, the offset $\epsilon$ ($\epsilon=\beta$ (ISO sensitivity)), which is expressed as a function of the ISO sensitivity set for the image-capturing device, is added to the linear gradation signal x and then, the sum (x+$\epsilon$) resulting from the offset processing is converted to a ½ power gamma space. Thus, according to the law of propagation of errors, the error contained in the post-gamma conversion signal value having undergone the gamma correction after adding the offset $\epsilon$, manifests evenly over the full gradation range. Then, a single representative value is used to indicate the width of the fluctuation of the noise thus equalized over the entire gradation range as a noise profile for each specific ISO sensitivity level and the directional decision-making threshold value Th (Th$\propto$(ISO sensitivity)) is determined in correspondence to this representative value. As a result, the accuracy of the directional judgment executed in the interpolation processing is improved and, at the same time, the advantage of image restoration in the square root space, i.e., a higher image quality in the restored image, can be sustained with improved color clarity in the interpolated (restored) image.

(2) In addition to the advantage described above in (1), the curve 23 representing the offset-incorporated square root gradation space is characterized in that its slope over a small input linear signal value range (e.g., 0<x<0.1) is not as steep as the slope of the curve 22 representing the simple square root gradation space. Thus, the problem of the interpolation processing executed in the square root gradation space, i.e., noise in the input linear value becomes amplified, resulting in a greater level of noise contained in the output value and the quality of the restored image deteriorated by the amplified noise, does not occur when interpolation processing is executed in the offset-incorporated square root gradation space. This advantage becomes even more effective under conditions in which signals contain a great deal of dark noise (e.g., when the sensitivity setting at the image-capturing device is raised to a level equivalent to ISO 1600 to 6400 or when a significant dark current flows in the photoelectric conversion elements constituting the image-capturing device).

(3) Through the advantages described in (1) and (2) above, a high-definition restored image with no bleeding manifesting over the boundaries between dark areas and colored areas, which tends to occur in the linear gradation space, and without any dark streaking or dark edges manifesting over a color boundary, which tends to occur readily in the gamma space or the logarithmic space with a greater curvature than the square root gradation space, is obtained.

While an explanation is given above in reference to the embodiment on an example in which the color filters are disposed in the Bayer array, the present invention may also be adopted in conjunction with other filter arrays such as the delta array.

The interpolation processing (imaging restoration) explained above simply represents an example and the present invention may be adopted in processing executed through another interpolation method. For instance, the present invention may be adopted in the multiple color extrapolation disclosed in USP Application No. 2002/0001409, in the Y method interpolation described in International Publication WO02/071761 booklet, in the color ratio interpolation or the color difference extrapolation disclosed in USP Application No. 5552827 or in the delta array interpolation disclosed in Japanese Laid Open Patent Publication No. 2003-348608.

While an explanation is given above in reference to the embodiment on an example in which an image captured with a single-plate image-capturing device via color filters is processed, the present invention may instead be adopted when processing an image captured via a two-plate image-capturing device.

The specific values assumed for the offset $\Delta$, e.g., $\Delta$=0.05 Xmax (ISO 6400 equivalent) and $\Delta$=0.02 Xmax (ISO 1600 equivalent), are examples and the offset value may be adjusted as necessary in correspondence to the analog gain setting having been selected, the ambient temperature and the actual conditions of noise.

In the explanation provided above, a common offset $\Delta$ is added to the R component, the G component and the B component signal values. Instead, different offset values may be selected to be added to the signal values corresponding to the individual color components.

The offset processing (step S2) and the square root gamma correction processing (step S3) may be integrated into interpolation gamma correction processing.

The inverse gamma correction processing (step S5) and the inverse offset processing (step S6) may be integrated into inverse gamma correction processing.

When the offset processing and the square root gamma correction processing are integrated into the interpolation gamma correction processing executed at once, the signal values may be converted to values in an interpolation processing space as expressed in (27) below.

$$y = \frac{\sqrt{x+\varepsilon} - \sqrt{\varepsilon}}{\sqrt{1+\varepsilon} - \sqrt{\varepsilon}} \qquad (27)$$

$$\delta y = \left|\frac{dy}{dx}\right| \cdot \delta x = \frac{\alpha(g)}{\sqrt{1+\varepsilon} - \sqrt{\varepsilon}} \cdot \sqrt{\frac{x+\beta(g)}{x+\varepsilon}} \qquad (28)$$

$$\delta y = \frac{\alpha(g)}{\sqrt{1+\beta(g)} - \sqrt{\beta(g)}} = const. \qquad (29)$$

It is to be noted that x=X/Xmax and y=Y/Ymax and that $\epsilon$ corresponds to the offset $\Delta$ ($\epsilon=\Delta$/Xmax).

The noise $\delta y$ in the interpolation gradation space expressed in (27) above can be expressed as in (28) by adopting the law of propagation of errors. By incorporating $\epsilon=\beta$ (g) for substitution in expression (28), the noise $\delta y$ is expressed as in (29), which indicates that the interpolation gradation space remains to be a uniform noise space as long as $\epsilon=\beta$ (g) is true.

Figure 13:
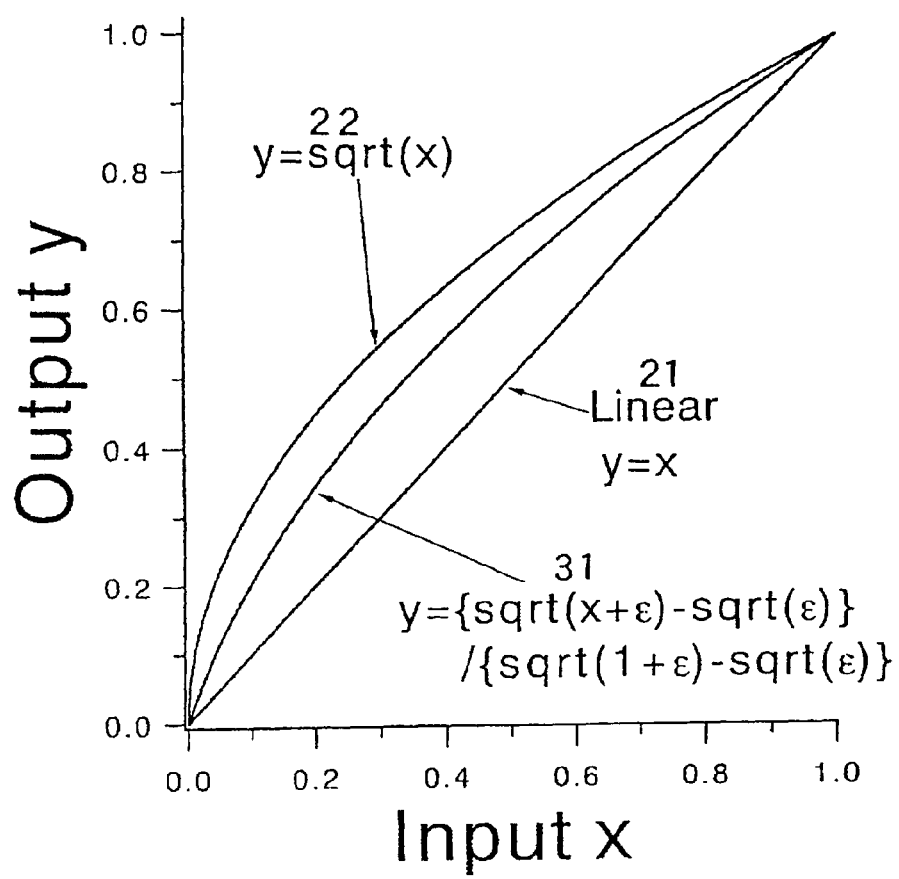
FIG. 13 shows the input output characteristics of various gradation spaces.

FIG. 13 shows the input/output characteristics observed in the linear gradation space, the square root gradation space and the interpolation gradation space resulting from the conversion expressed in (27). In FIG. 13, the linear gradation signal input value x is indicated along the horizontal axis and the output value y following the gradation conversion is indicated along the vertical axis. A straight line 21 and a curve 22, identical to those in FIG. 12, respectively indicate the input/output characteristics observed during the linear conversion and the input/output characteristics observed during the conversion to the square root space. A curve 31 indicates the input/output characteristics observed during the conversion to the interpolation gradation space. The curve 31 differs from the curve 23 in FIG. 12 in that it passes through the origin point. By restoring the image in such an interpolation gradation space, too, the restored image achieves high quality as in the image restoration executed by using the offset-incorporated square root gradation space indicated by the curve 23 in FIG. 12.

Instead of the offset-incorporated square root gradation space (curve 23), a gradation space represented by a curve, the curvature of which is altered in correspondence to the ISO sensitivity selected at the image-capturing device may be used. In such a case, the curvature should be set to a greater value for a lower ISO sensitivity level and the curvature should be set to a smaller value for a higher ISO sensitivity level. The curvature can be increased by setting the curve closer to the square root characteristics (curve), whereas the curvature can be reduced by setting the curve closer to the linear characteristics (straight line). Such a gradation space may be obtained in the form of a space achieving the input/output characteristics expressed as "linear characteristics (straight line)+square root characteristics (curve)", a gamma space with Γ set to 1.67 or the like.

Second Embodiment

An explanation is given above in reference to the first embodiment on an image processing apparatus that restores an image by executing interpolation processing in a uniform noise space (an offset-incorporated square root gradation space (or an interpolation processing space)). The uniform noise space can also be utilized effectively when executing processing other than interpolation processing. In the second embodiment, a flat area (an area where no shading change occurs) in an image is detected in the uniform noise space and smoothing processing is executed over the detected flat area.

Figure 14:
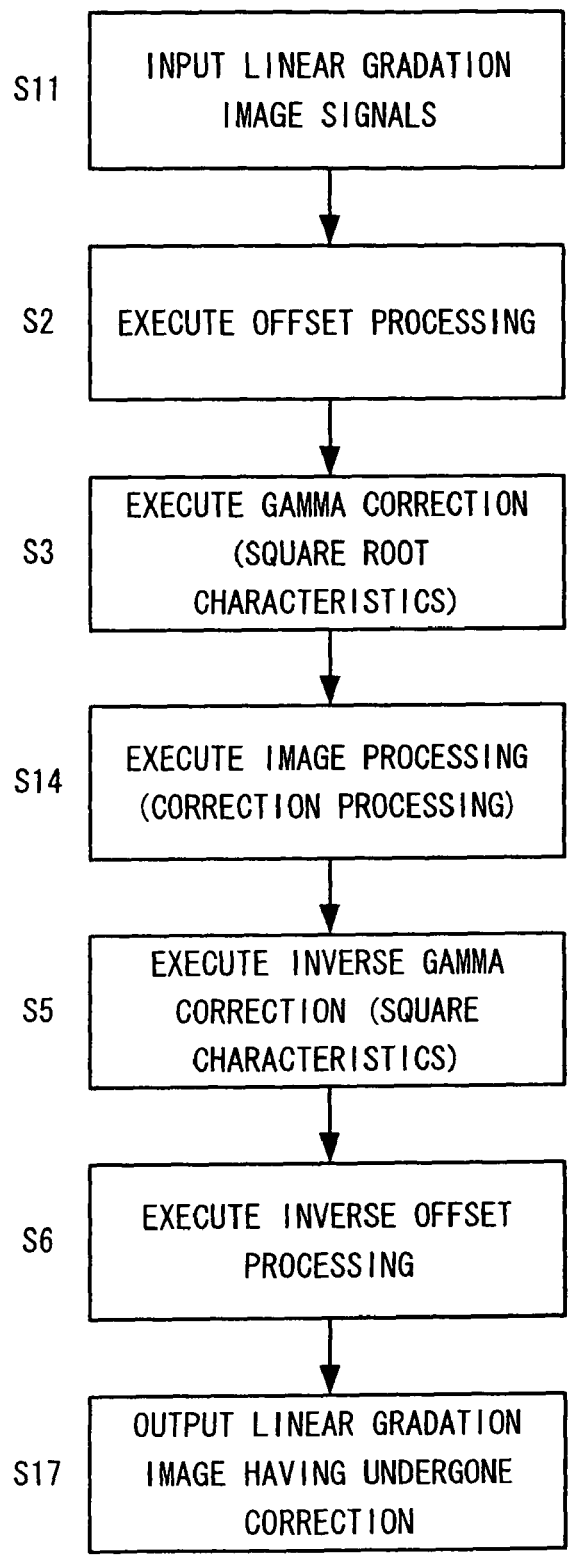
FIG. 14 presents a flowchart of the image processing executed in a second embodiment.

FIG. 14 presents a flowchart of the image processing executed in the second embodiment. In step S11 in FIG. 14, the CPU in the computer apparatus 100 (see FIG. 3) takes in image signals expressed in a linear gradation space and then the operation proceeds to step S2. The image signals input to the computer apparatus at this time may constitute, for instance, a monochromatic single-plate image, a color image obtained via a three-plate image-capturing device, an interpolated color image resulting from the interpolation processing executed in the first embodiment or the like.

Since the processing executed in step S2 and step S3 is identical to the processing executed in the steps with the same step numbers in FIG. 2, its explanation is omitted.

In step S14, the CPU executes the image processing (the flat area detection processing and the smoothing processing in this case).

(Flat Area Detection)

Assuming that the input image signals constitute a monochromatic image, the CPU extracts the high frequency component in the image signals as expressed in (30) below and as illustrated in FIG. 15.

$$YH(\vec{x}) = \Delta Y(\vec{x}) \tag{30}$$

It is to be noted that the target pixel is the pixel set at the central position in FIG. 15 and that Δ in expression 30 represents a Laplacian operator.

The CPU determines the level of flatness as expressed in (31) below based upon the high frequency component extracted as expressed in (30) above.

$$\text{if } YH(\vec{x}) \leq \sigma Th \quad \text{Flat}(\vec{x}) = 1 \atop \text{else} \quad \text{Flat}(\vec{x}) = 0 \tag{31}$$

It is to be noted that σTh represents a decision-making threshold value used to avoid any erroneous judgment due to noise in the signal, which satisfies a relationship expressed as σTh∝α(g). The CPU judges that the target image area is flat if the results of the operation executed as expressed in (31) indicate 1, but judges that the target image area is not flat if the results indicate 0.

(Smoothing Processing)

Based upon the judgment results obtained through the operation executed as expressed in (31), the CPU executes low pass filter processing as expressed in (32) below and as illustrated in FIG. 16. Through this processing, the high frequency component is eliminated and thus, a smoothing effect is achieved. Once the CPU completes the low pass filter processing (smoothing processing), the operation proceeds to step S5 in FIG. 14.

$$\text{if } \text{Flat}(\vec{x}) = 1 \quad Y'(\vec{x}) = LPF(Y(\vec{x})) \atop \text{else} \quad Y'(\vec{x}) = Y(\vec{x}) \tag{32}$$

Since the processing executed in step S5 and step S6 is identical to the processing executed in the steps with the same step numbers in FIG. 2, its explanation is omitted.

In step S17, the CPU outputs the image having undergone the correction processing, i.e., the image signals expressed in the linear gradation space, before the processing in FIG. 14 ends.

In the second embodiment explained above, the use of the uniform noise space allows the noise profile corresponding to each ISO sensitivity level to be expressed with a single representative value (α(g)) over the entire gradation range and the decision-making threshold value σTh (σTh∝α(g)) used in the flat area detection can be determined in correspondence to the representative value. Thus, a flat area in the image can be detected and extracted with ease, simplicity and a high level of accuracy. Since the smoothing processing is then executed over the extracted flat area, the optimal smoothing processing can be executed over the entire gradation range by eliminating any inconsistency in the execution of the smoothing processing whereby noise, the characteristics of which change in correspondence to the brightness of the image, affects the execution of the smoothing processing, i.e., whether the smoothing processing is executed or not executed.

Instead of the LPF (low pass filter) processing expressed in (32), the CPU may execute BPF (band pass filter) processing for edge emphasis. However, it is desirable to execute the BPF processing over an area that is not flat.

Third Embodiment

In reference to the third embodiment, an explanation is given on noise removal processing executed in the uniform noise space individually for the luminance plane and the color difference planes of a color image.

In step S11 in FIG. 14, the CPU takes in image signals expressed in a linear gradation space and then the operation proceeds to step S2. Since the processing executed in step S2 and step S3 is identical to the processing executed in the steps with the same step numbers in FIG. 2, its explanation is omitted.

In step S14, the CPU executes the image processing (color space conversion (RGB->YCbCr) processing, noise removal processing and color space conversion (YCbCr->RGB) processing in this case). The CPU converts the image signals in the color space (RGB) to signals in the color space (YCbCr) through color space conversion processing of the known art executed by using a 3×3 matrix coefficient. The CPU also executes noise removal processing (Gaussian smoothing processing in this example) as expressed in (33) below individually for the luminance signal Y, the color difference signal Cb and the color difference signal Cr resulting from the conversion.

$$Y'(\vec{x}) = f(Y(\vec{x}), \sigma Th)$$
$$Cr'(\vec{x}) = f(Cr(\vec{x}), \sigma Th)$$
$$Cb'(\vec{x}) = f(Cb(\vec{x}), \sigma Th),$$

$$f(A(\vec{x}), \sigma Th) = \frac{\int A(\vec{x'}) \exp\left(-\frac{|A(\vec{x}) - A(\vec{x'})|^2}{\sigma Th^2}\right) d\vec{x'}}{\int \exp\left(-\frac{|A(\vec{x}) - A(\vec{x'})|^2}{\sigma Th^2}\right) d\vec{x'}}$$
(33)

It is to be noted that $\vec{x}$ indicates the target pixel within a two-dimensional plane and that $\vec{x}'$ indicates a nearby pixel. Since the weighting coefficient for smoothing is determined in correspondence to the ratio of the change in the pixel value difference $|A(\vec{x})-A(\vec{x}')|$ to the threshold value $\sigma Th$ ($\sigma Th \propto \alpha(g)$), the individual planes Y, Cb and Cr are blurred based upon the extent of noise fluctuation. Namely, even when $A(\vec{x}') \approx A(\vec{x})$ is true in a flat area, a fluctuation still exists to an extent approximated as $A(\vec{x}')=A(\vec{x}) \pm \sigma Th$, and an area with similar signals manifesting this extent of fluctuation is designated as a smoothing target area, whereas an area such as an edge area where the varying image structures are present and $|A(\vec{x}')-A(\vec{x})| >> \sigma Th$ is true, is not considered to be a smoothing target area. It is to be noted that the integration range for smoothing may be set freely to a 7×7 pixel range, a 15×15 pixel range or the like, to best suit the specific purposes of application. Once the CPU completes the Gaussian smoothing processing described above, it converts the color space (YCbCr) to the color space (RGB) and then the operation proceeds to step S5 in FIG. 14.

Since the processing executed in step S5 and S6 is identical to the processing executed in the steps with the same step numbers in FIG. 2, its explanation is omitted.

In step S17, the CPU outputs the image having undergone the image processing, i.e., the image signals expressed in the linear gradation space, before the processing in FIG. 14 ends.

In the third embodiment explained above, the use of the uniform noise space allows the noise profile corresponding to each ISO sensitivity level to be expressed with a single representative value over the entire gradation range and since the ratio of the signal difference-based smoothing weighting coefficient used in the Gaussian smoothing processing can be determined in correspondence to the representative value. As a result, the extent of the Gaussian smoothing processing does not become inconsistent due to noise, the characteristics of which change in correspondence to the brightness of the image and thus, the Gaussian smoothing processing is greatly facilitated. Furthermore, an outstanding noise removal effect is achieved over the entire gradation range.

The noise removal processing executed for the color difference planes effectively minimizes the extent of mottling or color moiré. In addition, the noise removal processing executed for the luminance plane is effective in minimizing graininess.

While an explanation is given above on the noise removal processing executed by using the common threshold value $\sigma Th$ for the luminance and color difference signals, the noise removal processing for each type of signal may be executed independently by using a special parameter different from the parameters used to remove noise in the other types of signals. Also, the noise removal processing may be executed only for the color difference planes, or it may be executed for the luminance plane alone.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2004-200890 filed Jul. 7, 2004

The invention claimed is:

1. An image processing apparatus that converts image signals in an input color space to image signals in an image processing space, executes a predetermined image processing with image signals in the image processing space, and then converts image signals which have undergone the predetermined image processing to image signals in an output color space, comprising:
   a processor for performing processing of image processing units;
   an offset unit that uses the processor to add an offset signal indicating a predetermined positive quantity to each of linear gradation image signals expressed as a signal in proportion to a quantity of received light at each pixel in the process of conversion from the input color space to the image processing space;
   a first gradation conversion unit that uses the processor to convert each of the image signals to which the offset signal has been added by the offset unit to a nonlinear gradation image signal in the image processing space;
   an image processing unit that uses the processor to execute the predetermined image processing with image signals corresponding to a plurality of pixels, which have undergone the gradation conversion by the first gradation conversion unit; and a second gradation conversion unit that uses the processor to convert image signals which have undergone the image processing by the image processing unit to linear gradation image signals in the process of conversion to the output color space, wherein the image processing unit converts a first image to a second image by using the image signals corresponding to a plurality of pixels, which have undergone the gradation conversion by the first gradation conversion unit, and the second gradation conversion unit executes inverse conversion to inversely convert each of signals constituting the second image to the linear gradation image signal, and executes conversion to output image signals in the output color space by using image signals obtained by subtracting the offset signal indicating the predetermined positive quantity from each of the image signals having undergone the inverse gradation conversion.

2. An image processing apparatus that converts image signals in an input color space to image signals in an image processing space, executes a predetermined image processing with image signals in the image processing space, and then converts image signals which have undergone the predetermined image processing to image signals in an output color space comprising:

a processor for performing processing of image processing units;

an offset unit that uses the processor to add an offset signal indicating a predetermined positive quantity to each of linear gradation image signals expressed as a signal in proportion to a quantity of received light at each pixel in the process of conversion from the input color space to the image processing space;

a first gradation conversion unit that uses the processor to convert each of the image signals to which the offset signal has been added by the offset unit to a nonlinear gradation image signal in the image processing space;

an image processing unit that uses the processor to execute the predetermined image processing with image signals corresponding to a plurality of pixels, which have undergone the gradation conversion by the first gradation conversion unit; and a second gradation conversion unit that uses the processor to convert image signals which have undergone the image processing by the image processing unit to linear gradation image signals in the process of conversion to the output color space, wherein the image signals in the input color space are image signals constituted with a plurality of types of color component signals with at least one color component signal which is expressed as a signal in proportion to a quantity of received light for each pixel, the image processing unit executes a processing for generating at least one common color component signal for each pixel by using image signals corresponding to a plurality of pixels, which have undergone the gradation conversion by the first gradation conversion unit, and the second gradation conversion unit executes inverse conversion to inversely convert each of image signals constituted with a plurality of types of color component signals to the linear gradation image signal, and executes conversion to output image signals in the output color space by using image signals obtained by subtracting the offset signal indicating the predetermined positive quantity from each of the image signals having undergone the inverse gradation conversion.

3. An image processing apparatus that converts image signals in an input color space to image signals in an image processing space, executes a predetermined image processing with image signals in the image processing space, and then converts image signals which have undergone the predetermined image processing to image signals in an output color space, comprising:

a processor for performing processing of image processing units;

a first gradation conversion unit that uses the processor to convert each of the linear gradation image signals expressed as a signal in proportion to a quantity of received light at each pixel to a nonlinear gradation image signal in the image processing space in the process of conversion from the input color space to the image processing space;

an image processing unit that uses the processor to execute the predetermined image processing with image signals corresponding to a plurality of pixels, which have undergone the gradation conversion by the first gradation conversion unit;

a second gradation conversion unit that uses the processor to convert image signals which have undergone the image processing by the image processing unit to linear gradation image signals in the process of conversion to the output color space;

a control unit that uses the processor to control the first gradation conversion unit so as to alter nonlinear gradation characteristics in correspondence to an imaging sensitivity setting selected at an image-capturing device while capturing an image.

4. An image processing apparatus according to claim 3, wherein:

the image processing space is a uniform noise space where noise is uniform.

5. An image processing apparatus according to claim 3, wherein:

the image processing unit converts a first image to a second image by using the image signals corresponding to a plurality of pixels, which have undergone the gradation conversion by the first gradation conversion unit.

6. An image processing apparatus according to claim 3, wherein:

the image signals in the input color space are image signals constituted with a plurality of types of color component signals with at least one color component signal which is expressed as a signal in proportion to a quantity of received light for each pixel; and the image processing unit executes a processing for generating at least one common color component signal for each pixel by using image signals corresponding to a plurality of pixels, which have undergone the gradation conversion by the first gradation conversion unit.

7. An image processing apparatus according to claim 3, wherein:

the control unit controls the first gradation conversion unit so as to increase a curvature of low-brightness side gradation characteristics when a lower imaging sensitivity setting is selected and to reduce the curvature of the low-brightness side gradation characteristics when a higher imaging sensitivity setting is selected.

8. An image processing apparatus according to claims 3, wherein:

the control unit controls the first gradation conversion unit so as to make nonlinear gradation characteristics more closely approximate square root gradation characteristics when a lower imaging sensitivity setting is selected.

9. An image processing apparatus according to claim 6, wherein:

the image processing unit generates the common color component signal for each of the pixels by using signals corresponding to at least two different color components.

10. An image processing apparatus according to claim 9, wherein:
the image processing unit calculates similarity factors along at least two directions by using nonlinear color component signals corresponding to a plurality of pixels, which have undergone the gradation conversion by the first gradation conversion unit, judges a level of similarity manifesting along each of the two directions by comparing a difference between the similarity factors calculated along the two directions with a predetermined threshold value, and generates the common color component signal for each of the pixels based upon judgment results.

11. An image processing apparatus that converts image signals in an input color space to image signals in an image processing space, executes a predetermined image processing with image signals in the image processing space, and then converts image signals which have undergone the predetermined image processing to image signals in an output color space, comprising:
a processor for performing processing of image processing units;
an offset unit that uses the processor to add an offset signal indicating a predetermined positive quantity to each of linear gradation image signals expressed as a signal in proportion to a quantity of received light at each pixel in the process of conversion from the input color space to the image processing space;
a first gradation conversion unit that uses the processor to convert each of the image signals to which the offset signal has been added by the offset unit to a nonlinear gradation image signal in the image processing space;
an image processing unit that uses the processor to execute the predetermined image processing with image signals corresponding to a plurality of pixels, which have undergone the gradation conversion by the first gradation conversion unit; and
a second gradation conversion unit that uses the processor to convert image signals which have undergone the image processing by the image processing unit to linear gradation image signals in the process of conversion to the output color space, wherein
the offset unit executes an image conversion processing for converting image signals in the input color space to linear gradation image signals if image signals in the input color space are not linear gradation image signals, and then adds the offset signal to the linear gradation image signals.

12. An image processing apparatus according to claim 3, wherein:
the first gradation conversion unit executes an image conversion processing for converting image signals in the input color space to linear gradation image signals if image signals in the input color space are not linear gradation image signals, and then converts the linear gradation image signals to the nonlinear gradation image signals.

13. An image processing apparatus according to claim 3, wherein:
the second gradation conversion unit obtains the image signals in the output space by executing a further gradation conversion processing for converting the converted linear gradation image signals to image signals with a desirable gradation characteristics.

14. An image processing apparatus according to claim 3, wherein:
the predetermined image processing executed by the image processing unit includes at least one of noise removal processing and edge emphasis processing.

15. A non-transitory computer readable medium program product having contained therein an image processing program that enables a computer apparatus to execute:
a first gradation conversion processing for converting each of linear gradation image signals each expressed as a signal in proportion to a quantity of light received at each pixel in an input color space to a nonlinear gradation image signal in an image processing space;
an image processing for executing a predetermined image processing with image signals corresponding to a plurality of pixels, which have undergone the first gradation conversion processing;
a second gradation conversion processing for converting the image signals which have undergone the predetermined image processing to linear gradation image signals in an output color space; and
a gradation control processing for altering nonlinear gradation characteristics in correspondence to an imaging sensitivity setting selected at an image-capturing device while capturing an image.

* * * * *